United States Patent [19]
Joyner

[11] 4,227,735
[45] Oct. 14, 1980

[54] PROTECTIVE ENCLOSURE FOR A BUS DRIVER

[75] Inventor: Joseph C. Joyner, Queens Village, N.Y.

[73] Assignee: Joy-can Safety Products, Ltd., Queens Village, N.Y.

[21] Appl. No.: 4,455

[22] Filed: Jan. 18, 1979

[51] Int. Cl.² ............................................. B60R 27/00
[52] U.S. Cl. .................................... 296/24 R; 109/9
[58] Field of Search ...................... 296/24 R, 178, 190; 109/9, 49.5; 52/238

[56] References Cited

U.S. PATENT DOCUMENTS

| | | | |
|---|---|---|---|
| 3,397,005 | 8/1968 | May et al. | 296/24 R |
| 3,549,195 | 12/1970 | Kallinikos | 296/24 R |
| 3,632,155 | 1/1972 | Parker | 296/24 R |
| 4,035,014 | 7/1977 | Sellers | 296/24 R |

Primary Examiner—Robert R. Song
Attorney, Agent, or Firm—Arthur L. Plevy

[57] ABSTRACT

A protective enclosure for a bus driver includes a back wall fabricated from steel and secured to the inner walls of a bus by means of suitable angle irons or braces. A main support column is secured to the back wall at the other end. The back wall has a central area fabricated from a relatively impenetrable transparent material. A side section extends at right angles to the back wall and includes a door for gaining access to the enclosure. The door can be operated by means of a push bar located on the inside of the enclosure to enable a driver to exit the enclosure. The door also contains relatively large glass areas to provide an unobstructed view both to the driver and the passengers. Other features which include two-way communications and emergency devices are also disclosed.

10 Claims, 4 Drawing Figures

Fig. A.

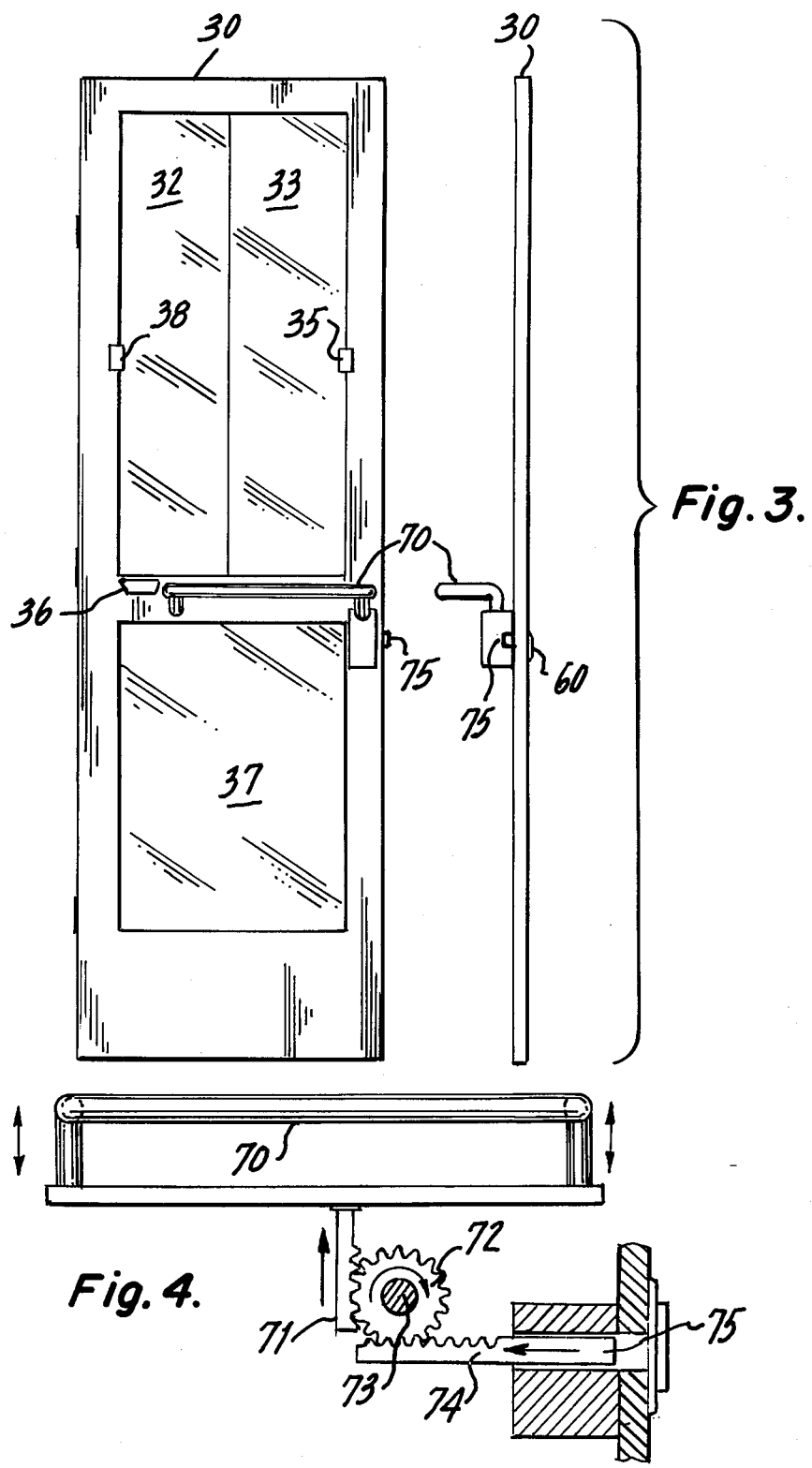

PROTECTIVE ENCLOSURE FOR A BUS DRIVER

BACKGROUND OF INVENTION

This invention relates to improvements in vehicle enclosures and more particularly to an apparatus for protecting bus drivers from various abuses.

Unfortunately, in urban areas, bus drivers have been subjected to many types of abuses including robbery and assault. Bus drivers, even though their route is specified, regularly are subjected to atrocious assaults and these crimes have been on the uptrend. The plight of a bus driver and the protection necessary is relatively unique as compared to drivers of other vehicles.

The prior art is cognizant of the general problem of providing protection to drivers of various vehicles and certain prior art references show enclosures which have been employed to protect taxicab drivers in order to prevent crimes against their person.

U.S. Pat. No. 2,566,032 entitled ROBBERY PREVENTING SHIELD FOR TAXI VEHICLE BODIES issued on Aug. 18, 1951 to I. J. Poland shows a vertical screen which is mounted between the driver and the passenger. The screen is operated by a foot pedal which allows the driver to move the screen upwardly when desired.

U.S. Pat. No. 3,469,090 entitled PARTITION FOR VEHICLE BODIES issued on Sept. 23, 1969 depicts a bullet-proof partition incorporating a money transfer opening. U.S. Pat. No. 3,549,195 depicts still another type of protective device or enclosure for the driver of a taxicab; which compartment consists of a glass partition and includes electric locking means coupled to the passenger doors.

The above patents and others depict various enclosures to protect a driver of a taxicab of a conventional vehicle from assault during normal operations. In any event, the problems associated with providing protection to the driver of a bus are more severe and are not easily implemented by the references to the types of enclosures depicted in the prior art.

The operation of a bus is extremely different than the operation of a taxicab or similar vehicle. A bus driver services a continuous flow of passengers, must constantly accept change, accept transfers and provide all sorts of other information to such passengers. The driving of a bus in an urban area requires great concentration and control and requires that any enclosure provided enable the driver to maintain control of the vehicle, while permitting him to adequately serve his passengers. Based on such factors and other requirements, a protective enclosure for a bus driver poses considerable restraints in regard to the overall formulation of the apparatus.

It is therefore an object of the present invention to provide a protective enclosure for a bus driver which is universal in nature and design, while enabling the driver to perform all functions required of him with a minimum of difficulty. A further aspect of the apparatus is to provide an enclosure which is capable of being rapidly installed in a vehicle and easily maintained and operated.

BRIEF DESCRIPTION OF THE PREFERRED EMBODIMENT

A protective enclosure apparatus for a bus driver area, said enclosure mounted in a bus vehicle to surround a driver when operating said vehicle, comprising a vertical support extending from the floor to the ceiling of said bus, a back panel coupled at one side to the side of said bus and coupled to said vertical support at said other side, said back panel extending from the floor to the ceiling of said bus and having a relatively central area fabricated from a strong transparent material to allow visual access, a side panel transverse to said back panel and coupled to said vertical support at one end and the front area of said bus at the other end, said side panel extending from the floor to the ceiling of said bus and including a door, said door having a large area fabricated from a strong transparent material to allow visual access with said back and side panels forming an enclosure about said driver area, with access to said area afforded by said door, locking means coupled to said door to permit access to said enclosure by means of a key in a first mode when a driver enters said enclosure and an upward actuator coupled to said locking means to actuate the same from within said enclosure by exerting a unidirectional force to allow exit from said enclosure.

BRIEF DESCRIPTION OF THE FIGURES

FIG. 3 shows a front and side view of an enclosure door employing a panic bar assembly.

FIG. 4 is a schematic diagram depicting one embodiment of a panic bar and bolt operation.

DETAILED DESCRIPTION OF THE INVENTION

Figure 1:
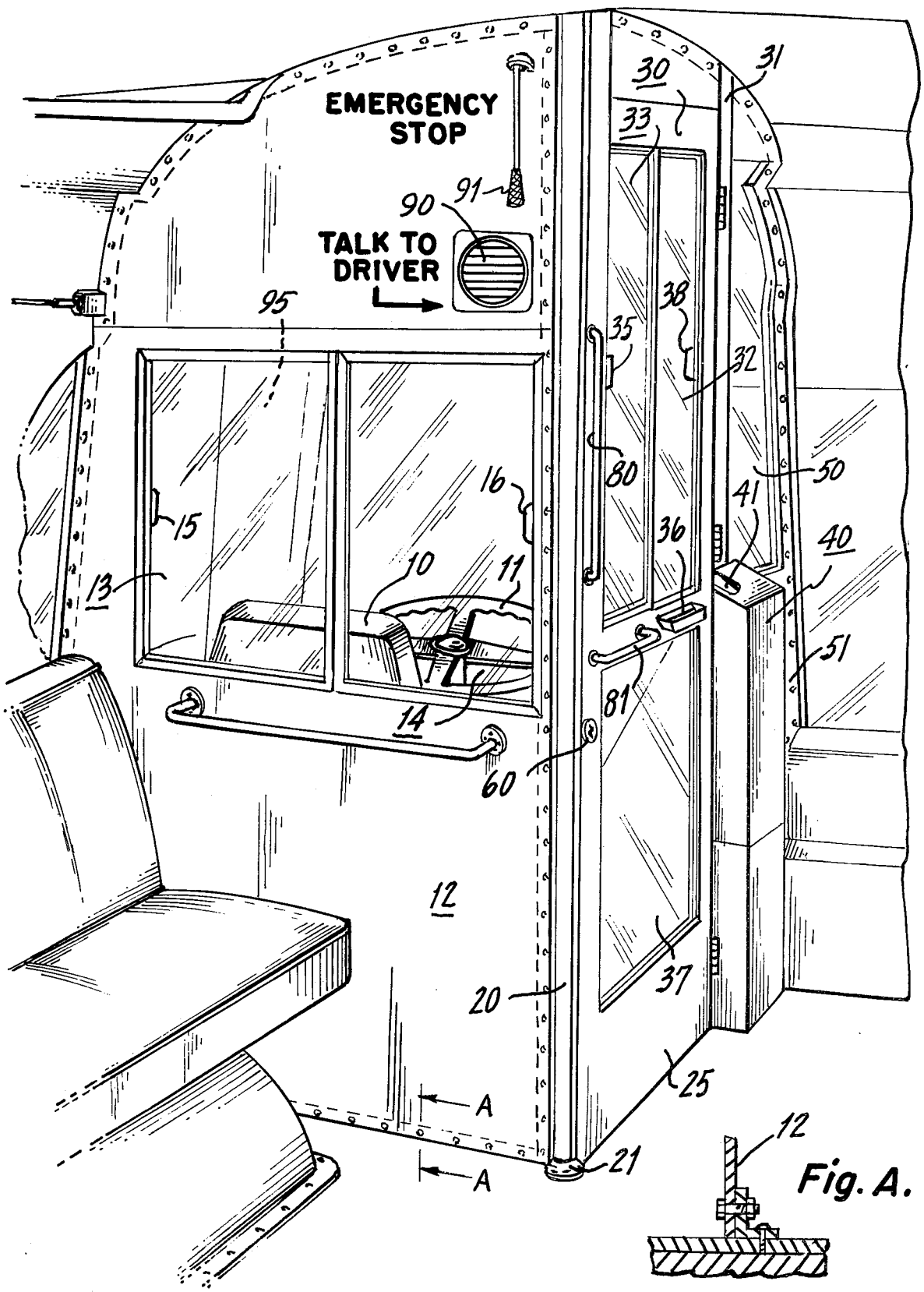
FIG. 1 is a perspective view of an enclosure according to this invention.

Referring to FIG. 1, there is shown a perspective view of the front section of a bus depicting an enclosure according to the present invention. At the onset, it is understood that the design considerations and structure may be accommodated to fit most conventional buses to provide a protective enclosure for the driver.

Shown in FIG. 1, is a driver's seat 10 located behind the steering wheel 11; both of which units are conventionally found in a typical bus. The enclosure primarily consists of a back wall section or panel 12. The section 12 has a central area which consists of two windows 13 and 14. The windows are conventionally mounted in a frame and can be slid or moved with respect to one another. Each window as 13 and 14 has a lock 15 and 16 associated therewith to enable the driver to permanently lock the windows on the inside and once access is obtained to the enclosure.

As can be seen from FIG. 1, the windows are quite large to enable the driver to have a clear view of conditions at the rear of the bus as is necessary for operation. The glass employed for the windows is preferably a bullet-resistance glass approximately 1 and 3/16" thick. Such glass has a designation as AS-2 and basically consists of multiple laminations of thinner glass layers superimposed one on the other. Such bullet-resistance glass is known in the art and has a listing of 730N and are U.L. approved. Thus, as one can ascertain, windows 13 and 14 when locked, provide a clear view for the driver while further providing a relatively impenetrable barrier.

The back wall is secured to the side wall of the bus by means of an angle iron which is contoured to conform to the contours associated with the particular body design of the bus. The angle iron is shown in dashed lines in the FIG. Screws or rivets secure the back wall to the angle iron to enable servicing or removal of the same, if necessary.

As can be seen from the FIG, the back wall extends from the top of the bus to the bottom. The entire back wall is fabricated from a ¼" diamond plate steel which is an extremely strong and rugged material.

The bottom of the panel 12 is also secured to the floor of the bus by means of another angle iron. A main support column 20 is secured to the back wall by means of suitable fasteners or screws. The support 20 is a rectangular steel column which has a top and a bottom flange as 21 (bottom flange) to enable the securing of the same to the floor and ceiling of the bus and hence, forms a vertical column unto which the back wall or panel 12 can be secured.

Figure 2:
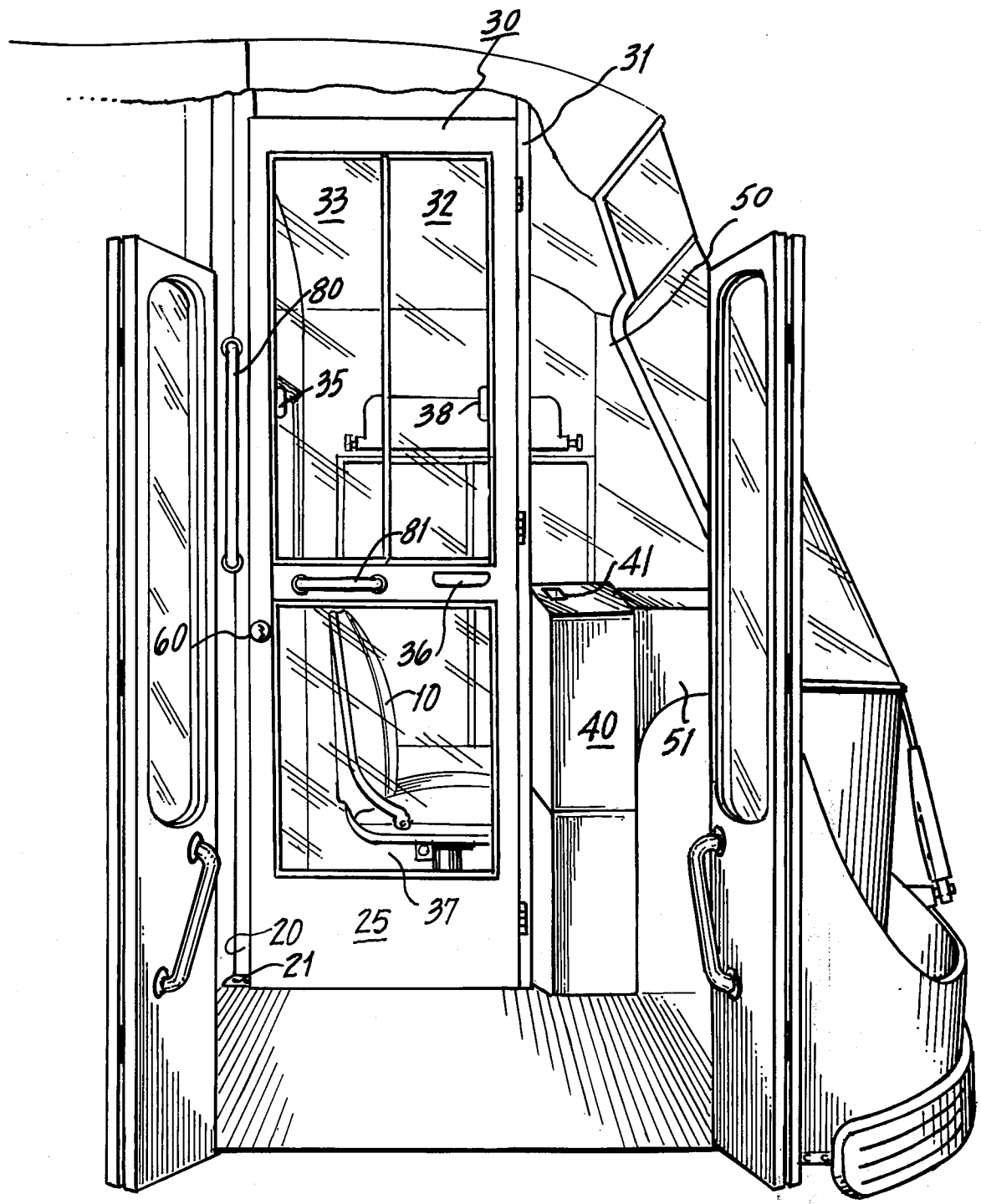
FIG. 2 is a side view of the enclosure depicted in FIG. 1.

A composite side wall 25 is shown. The side wall extends at a relatively right angle from the back wall 12 and is secured to the center line of the windshield of the bus at the other end. Essentially, as seen in FIGS. 1 and 2, the side panel 25 includes a door 30. The door 30 is fabricated from a steel frame and is hinged to another vertical column 31 which is positioned relatively parallel to column 20. The door includes two windows 32 and 33 which are of the slideable type as windows 13 and 14 and which are associated with two locks 35 and 38 to enable the driver to lock the windows from the inside or to move them with respect to one another, if desired.

The door further includes a low window section 37 which is also fabricated from a bullet resistance glass as are windows 32 and 33.

As can be ascertained both from FIGS. 1 and 2, the driver is virtually surrounded by a large glass area both at the rear and the side to enable both the driver and the passengers to achieve unobstructed vision.

Located in the center of the door 30 is a trough 36. The trough 36 essentially coacts with a slot approximately ⅛" in height to enable a passenger to insert a narrow piece of paper into the compartment so that a driver can receive the same. Thus, the trough 36 can be employed to direct transfers or other paper items to the driver of a bus as is customary.

As can be seen, the side panel 25 has an opening which accommodates a typical fare box 40. A portion of the fare box 40 is located within the driver's compartment to enable the driver to have access to the meters and the money, coins or tokens which are deposited by each passenger via the slot 41. It is, of course, understood that any type of fare box can be employed, although the one depicted in FIGS. 1 and 2 is relatively conventional. An aspect of this enclosure is that the coin slot is located outside the enclosure to enable passengers to deposit their fare as presently implemented. The portion of the fare box to receive the coins as well as associated meters and so on are located within the driver's compartment.

Extending from the right side of the door (FIG. 2), to the inner contour of the front of the bus is a hinged panel 50. Panel 50 is hinged on Column 31 and can be opened by the driver, when desired. The purpose of the hinged panel 50 is to enable the driver to have access to certain controls which are on the front of the bus, such as destination signs and so on. The panel 50 has a steel frame which is formed by suitable angle irons and adapted to completely conform to the contours of the bus at the right side as shown in FIG. 2. The central portion of panel 50 is fabricated from a transparent bullet resistance glass.

Located and extending between the right side of the fare box 40 and the front of the bus is an additional panel 51 fabricated from diamond plate steel.

Hence, as briefly shown above, the enclosure comprises a back panel 12 which has two bullet-proof windows located thereon. The back panel extends from the ceiling to the floor of the bus and has one side conforming to the contours of the bus. A vertical column is located at the corner of the back panel and is joined to a side panel which includes a door permitting access to the enclosure by the driver. A fare box is located such that a passenger can deposit coins within the fare box outside the enclosure, while the driver can receive the fare within the enclosure. The door also has movable windows which can be locked from the inside of the enclosure by the driver. The enclosure provides a large glass area to enable the driver to have unimpeded vision and hence, conduct and operate the bus as is customary.

As shown in FIGS. 1 and 2, the door 30 is associated with a lock 60. The driver of the bus has a key to the lock and can gain entry to the enclosure by means of the key.

Referring to FIG. 3, it is seen that the lock 60 is integral with a bar release 70 located on the inside of the door. Essentially, once the driver is within the enclosure, he can activate the bar 70 by an upward motion of the same to thereby release the lock. The bar 70 is relatively large and is operable only in an upward direction. A downward force on the bar 70 will not activate the bolt associated with lock 60. In this manner, the driver can use the bar 70 to rest his arm and so on when driving the bus.

In the event of an emergency situation, an upward push on bar 70 will disengage the bolt associated with lock 60 and enable the driver to leave the enclosure. Mechanisms for operating a lock by means of such a bar are well known in the art and many various types can be implemented. It is seen that this feature serves a dual purpose as it enables a driver to use the bar 70 as an arm rest while driving the vehicle and to allow him to immediately leave the enclosure in the event that is necessary by moving the bar upwardly.

Referring to FIG. 4, there is shown one mechanism for operating a bolt with a push bar as 70. The push bar 70 is shown and as indicated, is mounted so that it can be moved upwardly. Coupled to the push bar is a ratchet 71. A toothed gear 72 is rotatably mounted on the door frame via the center 73 which may be coupled to the lock. The gear 72 is coupled to a ratchet 74 which is integrally formed with the bolt 75.

As can be seen from FIG. 4, as the bar 70 is moved upwardly, ratchet 71 rotates the gear 72 which in turn moves the arm 74 to release the bolt. As one can ascertain, if the gear is rotated in the direction of the arrow, the bolt can also be moved to disengage the lock and hence, the gear 72 can be moved by means of a key or other device.

Also seen from FIG. 4 is that if a downward force is placed upon the bar 70, this will cause the bolt 75 to move into the lock recess and thus, a downward force tends to lock the components more rigidly. As indicated, this is one way of accomplishing the push bar operation.

Also seen in FIGS. 1 and 2 are hand holds 80 and 81 which are fabricated from steel tubing and enable passengers to grasp the same while the bus is moving and when they are standing in the area of the enclosure. A suitable support may also be placed on the back panel 12 as shown in the drawings.

Communication is provided by means of an intercom or speaker 90 which is located on the back panel which will enable a passenger to talk to the driver when the bus is in operation. Examples of intercom or audio systems suitable for such purposes are well known in the art. Thus passengers can communicate directly with the driver, as is customary.

Also shown located on the back panel is a lever or rope pull 91 which is designated on the drawings as an emergency stop. Essentially, this device operates similar to devices found in trains and so on and will enable a passenger to stop the bus in the event the driver loses conciousness based on an illness or other reason. As one can ascertain, the enclosure provided will prevent a passenger from access to the braking of a bus which is included within the enclosure. Hence, the lever 91 will enable a passenger, under an emergency condition, to stop the bus. Many techniques for coupling into the braking system of a vehicle to accomplish this result are well known and any such technique may be employed.

As can be seen from the above description, the compartment can be fabricated and implemented in a number of ways. It is, of course, understood that the main support column 20 functions to couple the back panel to the side panel and provides a suitable vertical edge for the door 30. Panels are secured to the bus frame by means of suitable angle irons which are known in the art and by means of screws to fasten and secure the various portions of the structure together. In this manner, the entire assembly can be rapidly installed and maintained.

Once a driver is within the enclosure, he can lock all his windows and hence be completely protected from the passengers. If a driver desires or wishes to forego such protection, he may open the windows in the back panel and the door and hence, have that exposure if desired.

Ventilation is conventionally provided within the enclosure by the typical vents which are employed in most buses in order to provide the driver with heat and air conditioning. The driver's comfort is totally secured by the enclosure since heating and air conditioning within the enclosure will not be effected by the passengers who may desire to open or close windows within the passenger compartment. The driver, of course, has access to a side window 95 which is conventional on all buses and can open and close the side windows without complaints from the passengers as all air will be confined within the enclosure.

Coupling of the various components of the enclosure to the frame of the bus by means of angle irons or other devices can readily be understood by the above noted description and alternate techniques for doing so should be apparent to those skilled in the art.

The entire periphery of the unit can be insulated by means of rubber gaskets which can be inserted between the various partitions to insure a relatively air-tight enclosure.

The enclosure depicted thus provides the following advantages:

1. A complete isolation of the driver to prevent assaults and other physical abuses.
2. Environment isolation of the driver to enable the driver to adjust the temperature according to his own desires without interference from the passengers.
3. A mechanism for rapidly leaving the compartment in the form of a panic bar in the event of emergencies.
4. A complete and relatively unobstructed visual field.
5. The ability of the driver to receive fares and transfers without contacting the passenger.
6. Providing communications between the driver and the passengers.

Many other features and advantages of the invention will become apparent to those skilled in the art upon reading the specification. It is understood that various modifications can be made to accommodate buses of practically any configuration without departing from the spirit and scope of the invention as described above and as encompassed within the following claims.

For example, the above described rubber gaskets also reduce vibration and therefore eliminate rattles and squeaks. It is also understood that the roof of the bus above the driver's compartment can contain an emergency hatch which will allow the driver to escape in the event the bus is overturned and he can also escape through the side window of the bus which can be of an emergency ejectable type.

I claim:

1. A protective enclosure apparatus for a bus driver area, said enclosure mounted in a bus vehicle to surround a driver when operating said vehicle, comprising:
   (a) a vertical support extending from the floor to the ceiling of said bus,
   (b) a back panel coupled at one side to the side of said bus and coupled to said vertical support at said other side, said back panel extending from the floor to the ceiling of said bus, and having a relatively central area fabricated from a strong transparent material to allow visual access,
   (c) a side panel transverse to said back panel and coupled to said vertical support at one end and the front area of said bus at the other end, said side panel extending from the floor to the ceiling of said bus and including a door, said door having a large area fabricated from a strong transparent material to allow visual access, with said back and side panels forming an enclosure about said driver area, with access to said area afforded by said door,
   (d) locking means coupled to said door to permit access to said enclosure in a first mode when a driver enters said enclosure and an actuator coupled to said locking means to actuate the same from within said enclosure by exerting a unidirectional force to allow exit from said enclosure.

2. The enclosure apparatus according to claim 1 further including:
   (a) a fare box apparatus coupled to said side wall, with a coin depositing slot located on the outer wall of said side wall to allow a passenger to deposit a fare, and coin receiving means associated with said fare box located on the inside of said enclosure to allow said driver to receive said fare.

3. The enclosure apparatus according to claim 1 further including:
   (a) a slot located in said door and communicating between the interior of said enclosure and the exterior to permit a passenger to exchange thin paper sheets with said driver.

4. The enclosure apparatus according to claim 1 wherein said strong transparent material comprises a bullet resistance glass.

5. The enclosure according to claim 1 further comprising:
(a) a two-way communication means coupled to said back wall of said enclosure to allow a person within said enclosure to communicate to persons outside said enclosure.

6. The enclosure according to claim 1 wherein said actuator comprises a relatively long horizontal bar coupled to said locking means and operative to actuate the same by an upward motion, said bar pivotally mounted on said door on the inside thereof, whereby a driver can exit said enclosure by exerting an upward force on said bar, and to employ said bar as an arm rest when operating said vehicle.

7. The enclosure according to claim 1 wherein said relatively central area of said back panel comprises two windows slideably mounted on said back panel and means coupled to said windows for locking the same from the interior of said enclosure.

8. The enclosure according to claim 1 wherein said areas of said back panel and said side panel adjacent said transparent areas is fabricated from a diamond plate steel.

9. The enclosure according to claim 1 further including emergency stopping means located on the exterior of said back panel and adapted when energized by a person outside said enclosure, to stop said vehicle.

10. The enclosure according to claim 1 further including at least one passenger support bar located on the exterior of said back or side wall and adapted to furnish a support for a passenger.

* * * * *